(12) United States Patent
Zhu et al.

(10) Patent No.: US 9,953,024 B2
(45) Date of Patent: Apr. 24, 2018

(54) METHOD AND DEVICE FOR EXPANDING DATA OF BILINGUAL CORPUS, AND STORAGE MEDIUM

(71) Applicant: BEIJING BAIDU NETCOM SCIENCE AND TECHNOLOGY CO., LTD., Beijing (CN)

(72) Inventors: Xiaoning Zhu, Beijing (CN); Zhongjun He, Beijing (CN); Hua Wu, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/892,933

(22) PCT Filed: Sep. 4, 2014

(86) PCT No.: PCT/CN2014/085947
§ 371 (c)(1),
(2) Date: Nov. 20, 2015

(87) PCT Pub. No.: WO2015/067092
PCT Pub. Date: May 14, 2015

(65) Prior Publication Data
US 2016/0239481 A1   Aug. 18, 2016

(30) Foreign Application Priority Data
Nov. 5, 2013   (CN) .......................... 2013 1 0544597

(51) Int. Cl.
*G06F 17/21* (2006.01)
*G06F 17/27* (2006.01)
(Continued)

(52) U.S. Cl.
CPC ...... *G06F 17/2735* (2013.01); *G06F 17/2827* (2013.01); *G06F 17/2845* (2013.01);
(Continued)

(58) Field of Classification Search
None
See application file for complete search history.

(56) References Cited

U.S. PATENT DOCUMENTS 5,475,586 A * 12/1995 Sata ...................... G06F 17/271
704/2
6,092,035 A * 7/2000 Kurachi .............. G06F 17/2872
704/3
(Continued)

FOREIGN PATENT DOCUMENTS

CN   101194253 A   6/2008
CN   102346733 A   2/2012
(Continued)

OTHER PUBLICATIONS

International Search Report for PCT/CN2014/085947 dated Dec. 12, 2014, 2 pages.
(Continued)

*Primary Examiner* — Satwant Singh
(74) *Attorney, Agent, or Firm* — Seed IP Law Group LLP (57) ABSTRACT

Disclosed are a method and a device for expanding data of a bilingual corpus. The method for expanding data of a bilingual corpus includes: searching, in a source language-pivot language corpus, for at least one first pivot language phrase semantically matching a first source language phrase; searching, in the source language-pivot language corpus, for at least one second source language phrase semantically matching each of the first pivot language phrases to form a source language phrase set by the second source language phrases; searching, in a pivot language-target language corpus, for at least one first target language phrase semantically matching each of the first pivot language phrases to form a target language phrase set by the first target language phrases; combining the second source language phrases in the source language phrase set with the first target language phrases in the target language phrase set, so as to form at
(Continued)

least one phrase pair in which a source language phrase and a target language phrase semantically match; and storing the formed at least one phrase pair in which the source language phrase and the target language phrase semantically match into a source language-target language corpus. Data in a bilingual corpus is expanded, so that the problem of data sparseness in the bilingual corpus is solved.

9 Claims, 4 Drawing Sheets

(51) Int. Cl.
    *G06F 17/28*     (2006.01)
    *G06F 17/20*     (2006.01)
    *G10L 21/00*     (2013.01)
    *G06F 17/30*     (2006.01)

(52) U.S. Cl.
    CPC .... *G06F 17/3043* (2013.01); *G06F 17/30489* (2013.01); *G06F 17/30654* (2013.01); *G06F 17/30669* (2013.01)

(56) References Cited

U.S. PATENT DOCUMENTS

| | | | | |
|---|---|---|---|---|
| 6,275,789 | B1* | 8/2001 | Moser | G06F 17/2872 704/2 |
| 7,844,447 | B2* | 11/2010 | Wang | G06F 17/271 704/10 |
| 8,209,166 | B2* | 6/2012 | Chino | G06F 17/2827 704/1 |
| 8,265,923 | B2* | 9/2012 | Chatterjee | G06F 17/2818 704/2 |
| 8,594,992 | B2* | 11/2013 | Kuhn | G06F 17/2827 704/2 |
| 9,760,569 | B2* | 9/2017 | Shin | G06F 17/289 |
| 2002/0069046 | A1* | 6/2002 | Bress | G06F 17/2836 704/1 |
| 2002/0173946 | A1* | 11/2002 | Christy | G06F 17/277 704/1 |
| 2005/0010421 | A1 | 1/2005 | Watanabe et al. | |
| 2007/0010989 | A1 | 1/2007 | Faruquie et al. | |
| 2007/0203690 | A1 | 8/2007 | Wang et al. | |
| 2008/0249760 | A1 | 10/2008 | Marcu et al. | |

FOREIGN PATENT DOCUMENTS

| | | |
|---|---|---|
| CN | 102591857 A | 7/2012 |
| CN | 103577399 A | 2/2014 |
| JP | 2002-117028 A | 4/2002 |
| JP | 2007-26256 A | 2/2007 |
| KR | 10-2011-0062867 A | 6/2011 |

OTHER PUBLICATIONS

Yao Wen-lin et al., "A Multilingual Ontology Based on Core Set of Concepts", 2006, *Ontology*, pp. 28-31 (with an English Abstract).

* cited by examiner

METHOD AND DEVICE FOR EXPANDING DATA OF BILINGUAL CORPUS, AND STORAGE MEDIUM

This patent application claims priority to Chinese Patent Application No. 201310544597.1, filed by the applicant, Beijing Baidu Netcom Science and Technology Co., Ltd., on Nov. 5, 2013 and entitled "METHOD AND DEVICE FOR EXPANDING DATA OF BILINGUAL CORPUS", which is incorporated herein by reference in its entirety.

TECHNICAL FIELD

The present invention relates to the technical field of machine translation, and particularly to a method and a device for expanding data of a bilingual corpus, and a storage medium.

BACKGROUND

Machine translation systems may be divided into rule-based machine translation systems, instance-based machine translation systems, and statistics-based machine translation systems. The statistics-based machine translation systems are a type of machine translation systems emerging in 1990s, and are also the major type of machine translation systems at present. The statistics-based machine translation systems do not require manually making rules and are applicable to all languages, and therefore have wide application.

The translation quality of the statistics-based machine translation systems largely depends on the quality of corpora. That is, a larger amount and a higher quality of data in the corpora result in a higher translation quality of the statistics-based machine translation systems. At the initial stage of corpus establishment, most corpora face the problem of data sparseness in the corpora.

SUMMARY

Accordingly, the present invention provides a method and a device for expanding data of a bilingual corpus, and a storage medium, so as to solve the problem of data sparseness of the bilingual corpus.

In a first aspect, an embodiment of the present invention provides a method for expanding data of a bilingual corpus, the method including:

searching, in a source language-pivot language corpus, for at least one first pivot language phrase semantically matching a first source language phrase;

searching, in the source language-pivot language corpus, for at least one second source language phrase semantically matching each of the first pivot language phrases to form a source language phrase set by the second source language phrases;

searching, in a pivot language-target language corpus, for at least one first target language phrase semantically matching each of the first pivot language phrases to form a target language phrase set by the first target language phrases;

combining the second source language phrases in the source language phrase set with the first target language phrases in the target language phrase set, so as to form at least one phrase pair in which a source language phrase and a target language phrase semantically match; and storing the formed at least one phrase pair in which the source language phrase and the target language phrase semantically match into a source language-target language corpus.

In a second aspect, an embodiment of the present invention provides a device for expanding data of a bilingual corpus, the device including:

a pivot language phrase search module, configured to search, in a source language-pivot language corpus, for at least one first pivot language phrase semantically matching a first source language phrase;

a source language phrase set establishment module, configured to search, in the source language-pivot language corpus, for at least one second source language phrase semantically matching each of the first pivot language phrases to form a source language phrase set by the second source language phrases;

a target language phrase set establishment module, configured to search, in a pivot language-target language corpus, for at least one first target language phrase semantically matching each of the first pivot language phrases to form a target language phrase set by the first target language phrases;

a phrase pair combination module, configured to combine the second source language phrases in the source language phrase set with the first target language phrases in the target language phrase set, so as to form at least one phrase pair in which a source language phrase and a target language phrase semantically match; and a phrase pair storage module, configured to store the formed at least one phrase pair in which the source language phrase and the target language phrase semantically match into a source language-target language corpus.

In a third aspect, an embodiment of the present invention provides one or more storage media containing computer executable instructions for performing a method for expanding data of a bilingual corpus, in which the method includes the following steps:

searching, in a source language-pivot language corpus, for at least one first pivot language phrase semantically matching a first source language phrase;

searching, in the source language-pivot language corpus, for at least one second source language phrase semantically matching each of the first pivot language phrases to form a source language phrase set by the second source language phrases;

searching, in a pivot language-target language corpus, for at least one first target language phrase semantically matching each of the first pivot language phrases to form a target language phrase set by the first target language phrases;

combining the second source language phrases in the source language phrase set with the first target language phrases in the target language phrase set, so as to form at least one phrase pair in which a source language phrase and a target language phrase semantically match; and storing the formed at least one phrase pair in which the source language phrase and the target language phrase semantically match into a source language-target language corpus.

According to the method and device for expanding data of a bilingual corpus, and the storage medium provided in the embodiments of the present invention, data in a bilingual source language-target language corpus is expanded through bidirectional mining of a source language-pivot language corpus and a pivot language-target language corpus, so that the problem of data sparseness in the bilingual corpus is solved.

BRIEF DESCRIPTION OF THE DRAWINGS

Other features, objectives and advantages of the present invention will become more apparent after reading the detailed description of non-limiting embodiments with reference to the following drawings, in which.

DETAILED DESCRIPTION OF EMBODIMENTS

The present invention will be described in further detail below with reference to the drawings and embodiments. It may be understood that specific embodiments described herein merely serve to explain the present invention and are not intended to limit the present invention. Further, it should be noted that for ease of description, only relevant parts but not all parts of the present invention are shown in the drawings.

Figure 1:
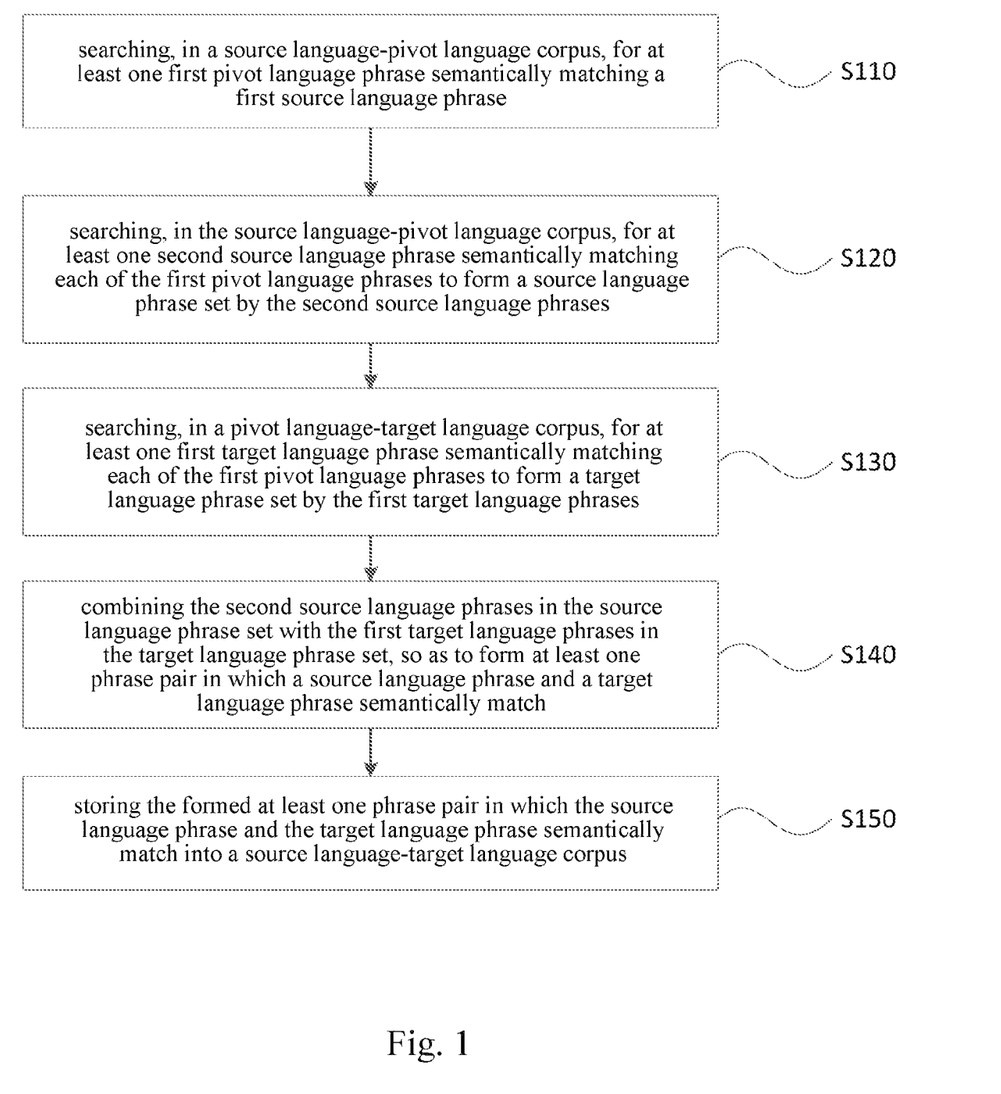
FIG. 1 is a schematic flowchart of a method for expanding data of a bilingual corpus provided in a first embodiment of the present invention.

FIG. 1 shows a first embodiment of the present invention

FIG. 1 is a schematic flowchart of a method for expanding data of a bilingual corpus provided in the first embodiment of the present invention. The method is applicable for expanding a bilingual source language-target language corpus on the basis of a source language-pivot language corpus and a pivot language-target language corpus. The method may be specifically implemented by a device for expanding data of a bilingual corpus. The device may be arranged in any apparatus having data processing capabilities, which may perform data interaction with each corpus. Referring to FIG. 1, the method for expanding data of a bilingual corpus includes the following steps.

In Step S110, it is searched, in a source language-pivot language corpus, for at least one first pivot language phrase semantically matching a first source language phrase.

A pivot language, also called an interlanguage, is an artificial language or a natural language used as an intermediate language during translation among multiple languages.

The source language-pivot language corpus is a database storing phrase pairs of source language phrases and pivot language phrases semantically matching the source language phrases. In this embodiment, the source language-pivot language corpus is used for providing pivot language phrases semantically matching source language phrases and performing deep mining on a semantic matching relationship between a pivot language and a source language.

The first source language phrase is a phrase belonging to the source language, and is a data source for expansion of the source language-target language corpus. That is to say, the method for expanding data of a bilingual corpus provided in this embodiment uses a source language phrase to expand the source language-target language corpus.

The first pivot language phrase is a phrase belonging to the pivot language. The first pivot language phrase semantically matches the first source language phrase used as the data source, and is used for mining the source language-pivot language corpus and the pivot language-target language corpus. The specific implementation of semantic matching may be set according to requirements. For example, phrases having the same semantics may be determined as matching phrases, or phrases having a similarity reaching a set threshold may be used as matching phrases.

Exemplarily, an example of expanding a bilingual Chinese-Spanish corpus is provided. During expansion of the Chinese-Spanish, English is used as the pivot language. The first source language phrase is a Chinese phrase "非常好吃". English phrases "very tasty" and "really delicious" are obtained as the first pivot language phrases by using the first source language phrase "非常好吃" to search in a Chinese-English corpus.

In Step S120, it is search, in the source language-pivot language corpus, for at least one second source language phrase semantically matching each of the first pivot language phrases, so that a source language phrase set is formed by the second source language phrases.

After the first pivot language phrases are obtained by search, the first pivot language phrases are used to search, in the source language-pivot language corpus, for second source language phrases matching the first pivot language phrase. The number of the second source language phrases is at least one. Matching may be performed for each of the first pivot language phrases separately, or some of the first pivot language phrases may be selected for matching. For example, phrases having high use frequencies may be selected for matching according to use frequencies of phrases.

In the above example for expanding the bilingual Chinese-Spanish corpus, the English phrases "very tasty" and "really delicious" serving as the first pivot language phrases are used to search, in the Chinese-English corpus, for Chinese phrases semantically matching the English phrases to serve as the second source language phrases. A search result is shown in the following table:

| Chinese-English corpus search result table | |
| --- | --- |
| English | Chinese |
| very tasty | 很可口 |
| very tasty | 非常好吃 |
| really delicious | 非常好吃 |

In Step S130, it is searched, in a pivot language-target language corpus, for at least one first target language phrase semantically matching each of the first pivot language phrases, so that a target language phrase set is formed by the first target language phrases.

The pivot language-target language corpus is a database storing phrase pairs of pivot language phrases and target language phrases semantically matching the pivot language phrases. In this embodiment, the pivot language-target language corpus is used for performing deep mining on a semantic matching relationship between a pivot language and a target language. In this step, matching may be performed for each of the above determined first pivot language phrases, or matching may be performed for some first pivot language phrases selected according to a preset rule.

In the above example of expanding the bilingual Chinese-Spanish corpus, the English phrases "very tasty" and "really delicious" serving as the first pivot language phrases are used to search, in an English-Spanish corpus, for Spanish phrases semantically matching the English phrases. A search result is shown in the following table:

| English-Spanish corpus search result table | |
|---|---|
| English | Spanish |
| really delicious | muy delicioso |
| really delicious | realmente delicioso |

In Step S140, the second source language phrases in the source language phrase set are combined with the first target language phrases in the target language phrase set, so as to form at least one phrase pair in which a source language phrase and a target language phrase semantically match.

After the source language phrase set and the target language phrase set are obtained by search in the source language-pivot language corpus and the pivot language-target language corpus, the second source language phrases in the source language phrase set and the first target language phrases in the target language phrase set are combined. The second source language phrases and the first target language phrases may be combined in one-to-one correspondence arbitrarily, or statistics collection and screening may be performed on all the combinations. A phrase pair may be recorded in the form of a key-value pair. Specifically, each second source language phrase in the source language phrase set is used as a key, and each first target language phrase in the target language phrase set is used as a value, so as to form at least one phrase pair in which a source language phrase and a target language phrase semantically match.

Using the above example of expanding the bilingual Chinese-Spanish corpus as an example, phrase pairs of Chinese phrases and Spanish phrases obtained after the English phrases are used to search in the Chinese-English corpus and the English-Spanish corpus are shown in the following table:

| Chinese-Spanish phrase pair | |
|---|---|
| Chinese | Spanish |
| 很可口 | muy delicioso |
| 很可口 | realmente delicioso |
| 非常好吃 | muy delicioso |
| 非常好吃 | realmente delicioso |

In Step S150, the at least one formed phrase pair in which the source language phrase and the target language phrase semantically match are stored into a source language-target language corpus.

The source language-target language corpus is a database used for storing phrase pairs of source language phrases and target language phrase semantically matching the source language phrases. After the phrase pairs of the source language phrases and the target language phrases are obtained, the phrase pairs of the source language phrases and the target language phrases are stored into the source language-target language corpus to serve as a corpus to be used by a system for performing statistics-based machine translation between the source language and the target language.

Figure 2:
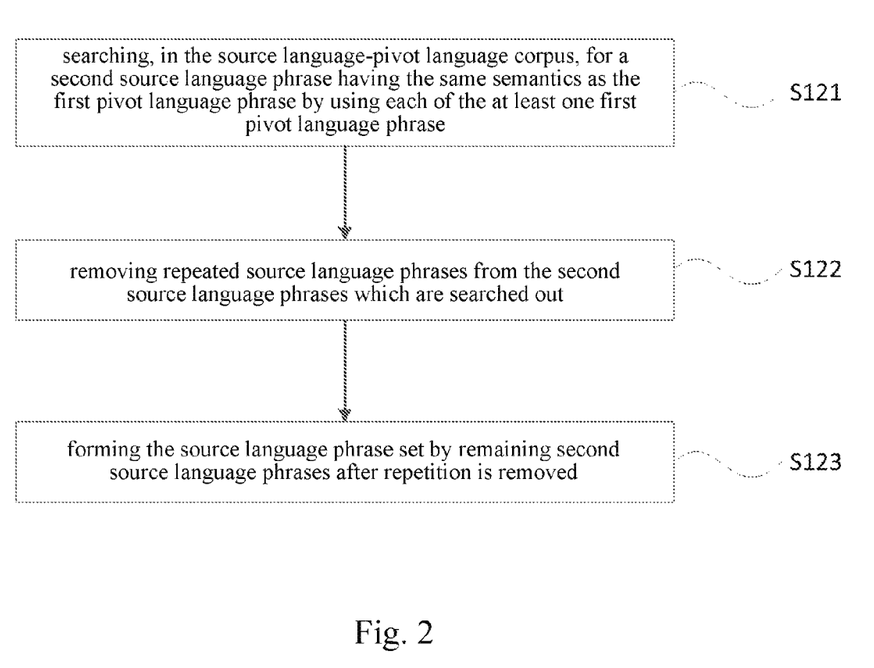
FIG. 2 is a schematic flowchart of establishing a source language phrase set in the method for expanding data of a bilingual corpus provided in the first embodiment of the present invention.

FIG. 2 is a schematic flowchart of establishing the source language phrase set in the method for expanding data of a bilingual corpus provided in the first embodiment of the present invention. Referring to FIG. 2, preferably, in this embodiment, the step of searching, in the source language-pivot language corpus, for at least one second source language phrase semantically matching each of the first pivot language phrases so as to form a source language phrase set by the second source language phrases includes the following substeps.

In Substep S121, it is searched, in the source language-pivot language corpus, for a second source language phrase having the same semantics as the first pivot language phrase by using each of the at least one first pivot language phrase.

In Substep S122, repeated source language phrases are removed from the found second source language phrases.

Because the number of the first pivot language phrases used for searching for the second source language phrases may be greater than one, repeated source language phrases may exist in the second source language phrases found in the source language-pivot language corpus, and the repeated source language phrases need to be removed from the found second source language phrases.

In Substep S123, the source language phrase set is formed by remaining second source language phrases after repetition is removed.

Figure 3:
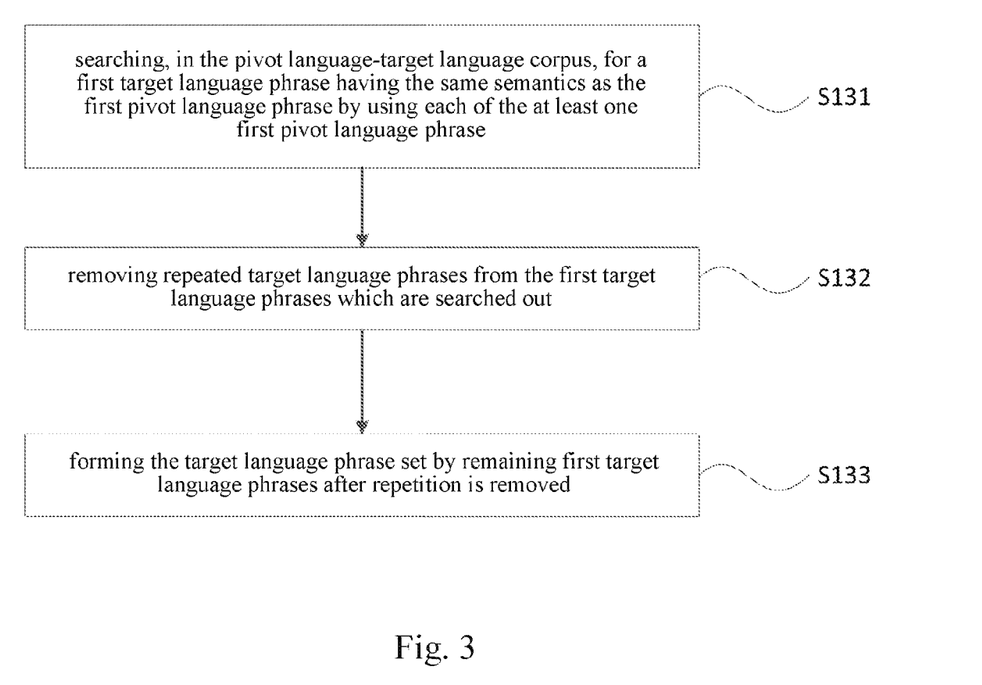
FIG. 3 is a schematic flowchart of establishing a target language phrase set in the method for expanding data of a bilingual corpus provided in the first embodiment of the present invention.

FIG. 3 is a schematic flowchart of establishing the target language phrase set in the method for expanding data of a bilingual corpus provided in the first embodiment of the present invention. Referring to FIG. 3, preferably, in this embodiment, the step of searching, in a pivot language-target language corpus, for at least one first target language phrase semantically matching each of the first pivot language phrases so as to form a target language phrase set by the first target language phrases includes the following substeps.

In Substep S131, it is searched, in the pivot language-target language corpus, for a first target language phrase having the same semantics as the first pivot language phrase by using each of the at least one first pivot language phrase.

In Substep S132, repeated target language phrases are removed from the found first target language phrases.

Because the number of the first pivot language phrases used for searching for the second source language phrases may be greater than one, repeated target language phrases may exist in the first target language phrases found in the pivot language-target language corpus, and the repeated target language phrases need to be removed from the found first target language phrases.

In Substep S133, the target language phrase set is formed by remaining first target language phrases after repetition is removed.

In this embodiment, data in a bilingual source language-target language corpus is expanded through mining of a source language-pivot language corpus and a pivot language-target language corpus, thereby solving the problem of data sparseness in the bilingual corpus.

Figure 4:
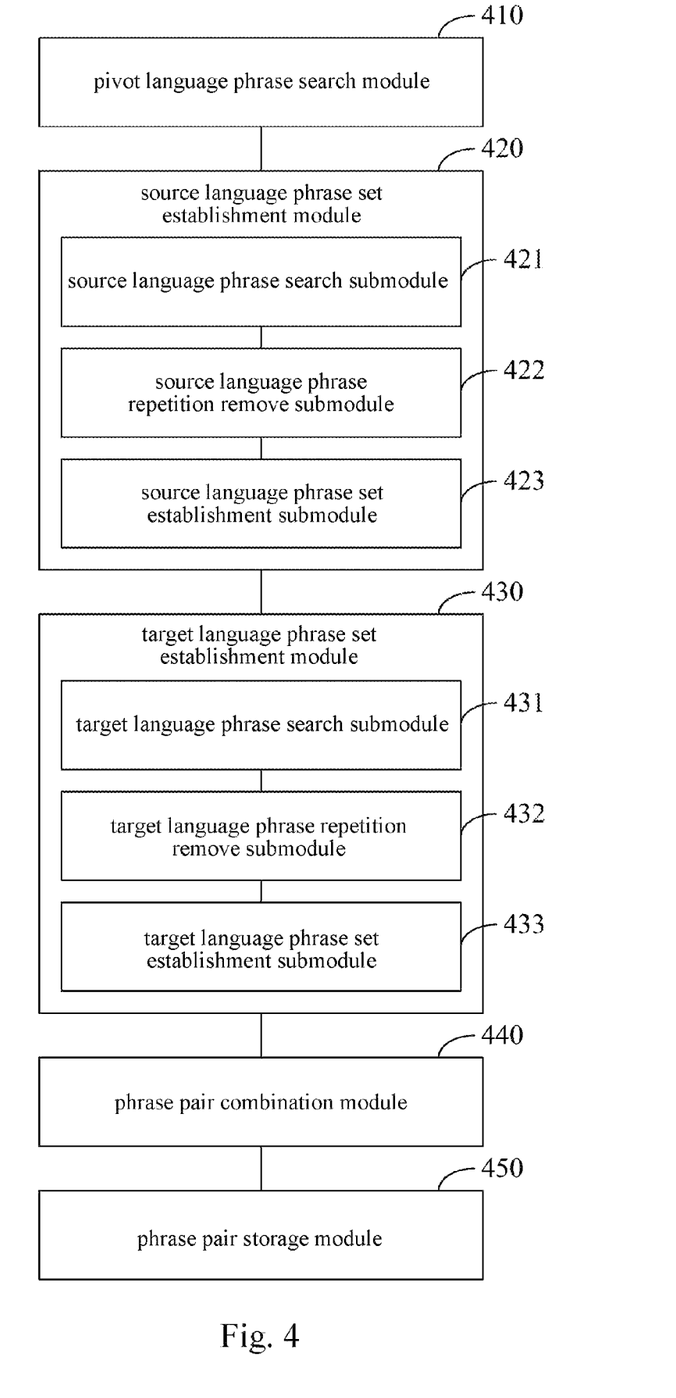
FIG. 4 is a schematic structural diagram of a device for expanding data of a bilingual corpus provided in a second embodiment of the present invention.

FIG. 4 shows a second embodiment of the present invention.

FIG. 4 is a schematic structural diagram of a device for expanding data of a bilingual corpus provided in the second embodiment of the present invention. Referring to FIG. 4, the device for expanding data of a bilingual corpus includes: a pivot language phrase search module 410, a source language phrase set establishment module 420, a target language phrase set establishment module 430, a phrase pair combination module 440, and a phrase pair storage module 450.

The pivot language phrase search module 410 is configured to search, in a source language-pivot language corpus, for at least one first pivot language phrase semantically matching a first source language phrase.

The source language phrase set establishment module 420 is configured to search, in the source language-pivot language corpus, for at least one second source language phrase semantically matching each of the first pivot language phrases to form a source language phrase set by the second source language phrases.

The target language phrase set establishment module 430 is configured to search, in a pivot language-target language corpus, for at least one first target language phrase semantically matching each of the first pivot language phrases to form a target language phrase set by the first target language phrases.

The phrase pair combination module 440 is configured to combine the second source language phrases in the source language phrase set with the first target language phrases in the target language phrase set, so as to form at least one phrase pair in which a source language phrase and a target language phrase semantically match.

The phrase pair storage module 450 is configured to store the at least one formed phrase pair in which the source language phrase and the target language phrase semantically match into a source language-target language corpus.

Preferably, the source language phrase set establishment module 420 includes: a source language phrase search submodule 421, a source language phrase repetition remove submodule 422, and a source language phrase set establishment submodule 423.

The source language phrase search submodule 421 is configured to search, in the source language-pivot language corpus, for a second source language phrase having the same semantics as the first pivot language phrase by using each of the at least one first pivot language phrase.

The source language phrase repetition remove submodule 422 is configured to remove repeated source language phrases from the found second source language phrases.

The source language phrase set establishment submodule 423 is configured to form the source language phrase set by remaining second source language phrases after repetition is removed.

Preferably, the target language phrase set establishment module 430 includes: a target language phrase search submodule 431, a target language phrase repetition remove submodule 432, and a target language phrase set establishment submodule 433.

The target language phrase search submodule 431 is configured to search, in the pivot language-target language corpus, for a first target language phrase having the same semantics as the first pivot language phrase by using each of the at least one first pivot language phrase.

The target language phrase repetition remove submodule 432 is configured to remove repeated target language phrases from the found first target language phrases.

The target language phrase set establishment submodule 433 is configured to form the target language phrase set by remaining first target language phrases after repetition is removed.

In this embodiment, data in a bilingual source language-target language corpus is expanded through mining of a source language-pivot language corpus and a pivot language-target language corpus, thereby solving the problem of data sparseness in the bilingual corpus.

Obviously, a person skilled in the art should understand that the above-mentioned modules or steps of the present invention may be implemented by a general-purpose computing device and may be distributed on a network formed by multiple computing devices. Optionally, the modules or steps may be implemented by program code executable by a computer device, so as to be stored in a storage device and executed by a computing device. Alternatively, the modules or steps may be separately made into integrated circuit modules, or multiple of the modules or steps may be made into a single integrated circuit module for implementation. In this way, the present invention is not limited to any specific combination of hardware and software. Based on this understanding, the technical solution of the present invention or the part that makes contributions to the prior art can be substantially embodied in the form of a software product. The computer software product is stored in a storage medium (such as a ROM/RAM, a magnetic disk, or an optical disc), and contains several instructions to instruct a terminal apparatus (for example, a mobile phone, a computer, a server, or a network apparatus) to perform the method as described in the embodiments of the present invention. Therefore, an embodiment of the present invention further provides one or more storage media containing computer executable instructions for performing a method for expanding data of a bilingual corpus, in which the method includes the following steps: searching, in a source language-pivot language corpus, for at least one first pivot language phrase semantically matching a first source language phrase; searching, in the source language-pivot language corpus, for at least one second source language phrase semantically matching each of the first pivot language phrases, and forming a source language phrase set by the second source language phrases; searching, in a pivot language-target language corpus, for at least one first target language phrase semantically matching each of the first pivot language phrases, and forming a target language phrase set by the first target language phrases; combining the second source language phrases in the source language phrase set with the first target language phrases in the target language phrase set, so as to form at least one phrase pair in which a source language phrase and a target language phrase semantically match; and storing the at least one formed phrase pair in which the source language phrase and the target language phrase semantically match into a source language-target language corpus.

The above descriptions are merely embodiments of the present invention but not intended to limit the patent scope of the present invention. Any equivalent variation in structure or flow made from the content of the drawings in the specification of the present invention, or direct or indirect application to other related technical fields should fall within the patent protection scope of the present invention.

The invention claimed is:

1. A method for expanding data of a bilingual corpus, comprising:
   searching, in a source language-pivot language corpus, for at least one first pivot language phrase semantically matching a first source language phrase;
   searching, in the source language-pivot language corpus, for at least one second source language phrase semantically matching each of the first pivot language phrases to form a source language phrase set by the second source language phrases;
   searching, in a pivot language-target language corpus, for at least one first target language phrase semantically matching each of the first pivot language phrases to form a target language phrase set by the first target language phrases;
   combining the second source language phrases in the source language phrase set with the first target language phrases in the target language phrase set, so as to form at least one phrase pair in which a source language phrase and a target language phrase semantically match; and storing the formed at least one phrase pair in which the source language phrase and the target language phrase semantically match into a source language-target language corpus.

2. The method according to claim 1, wherein searching, in the source language-pivot language corpus, for at least one second source language phrase semantically matching each of the first pivot language phrases to form a source language phrase set by the second source language phrases comprises:
  searching, in the source language-pivot language corpus, for a second source language phrase having the same semantics as the first pivot language phrase by using each of the at least one first pivot language phrase;
  removing repeated source language phrases from the second source language phrases which are searched out; and
  forming the source language phrase set by remaining second source language phrases after repetition is removed.

3. The method according to claim 1, wherein searching, in a pivot language-target language corpus, for at least one first target language phrase semantically matching each of the first pivot language phrases to form a target language phrase set by the first target language phrases comprises:
  searching, in the pivot language-target language corpus, for a first target language phrase having the same semantics as the first pivot language phrase by using each of the at least one first pivot language phrase;
  removing repeated target language phrases from the first target language phrases which are searched out; and
  forming the target language phrase set by remaining first target language phrases after repetition is removed.

4. The method according to claim 1, wherein combining the second source language phrases in the source language phrase set with the first target language phrases in the target language phrase set so as to form at least one phrase pair in which a source language phrase and a target language phrase semantically match comprises:
  forming at least one phrase pair in which a source language phrase and a target language phrase semantically match by using each second source language phrase in the source language phrase set as a key and using each first target language phrase in the target language phrase set as a value.

5. A device for expanding data of a bilingual corpus, comprising:
  a pivot language phrase search module, configured to search, in a source language-pivot language corpus, for at least one first pivot language phrase semantically matching a first source language phrase;
  a source language phrase set establishment module, configured to search, in the source language-pivot language corpus, for at least one second source language phrase semantically matching each of the first pivot language phrases to form a source language phrase set by the second source language phrases;
  a target language phrase set establishment module, configured to search, in a pivot language-target language corpus, for at least one first target language phrase semantically matching each of the first pivot language phrases to form a target language phrase set by the first target language phrases;
  a phrase pair combination module, configured to combine the second source language phrases in the source language phrase set with the first target language phrases in the target language phrase set, so as to form at least one phrase pair in which a source language phrase and a target language phrase semantically match; and
  a phrase pair storage module, configured to store the formed at least one phrase pair in which the source language phrase and the target language phrase semantically match into a source language-target language corpus.

6. The device according to claim 5, wherein the source language phrase set establishment module comprises:
  a source language phrase search submodule, configured to search, in the source language-pivot language corpus, for a second source language phrase having the same semantics as the first pivot language phrase by using each of the at least one first pivot language phrase;
  a source language phrase repetition elimination submodule, configured to remove repeated source language phrases from the second source language phrases which are searched out; and
  a source language phrase set establishment submodule, configured to form the source language phrase set by remaining second source language phrases after repetition is removed.

7. The device according to claim 5, wherein the target language phrase set establishment module comprises:
  a target language phrase search submodule, configured to search, in the pivot language-target language corpus, for a first target language phrase having the same semantics as the first pivot language phrase by using each of the at least one first pivot language phrase;
  a target language phrase repetition elimination submodule, configured to remove repeated target language phrases from the first target language phrases which are searched out; and
  a target language phrase set establishment submodule, configured to form the target language phrase set by remaining first target language phrases after repetition is removed.

8. The device according to claim 5, wherein the phrase pair combination module is specifically configured to form at least one phrase pair in which a source language phrase and a target language phrase semantically match by using each second source language phrase in the source language phrase set as a key and using each first target language phrase in the target language phrase set as a value.

9. One or more storage media containing computer executable instructions for performing a method for expanding data of a bilingual corpus, wherein the method comprises:
  searching, in a source language-pivot language corpus, for at least one first pivot language phrase semantically matching a first source language phrase;
  searching, in the source language-pivot language corpus, for at least one second source language phrase semantically matching each of the first pivot language phrases to form a source language phrase set by the second source language phrases;
  searching, in a pivot language-target language corpus, for at least one first target language phrase semantically matching each of the first pivot language phrases to form a target language phrase set by the first target language phrases;
  combining the second source language phrases in the source language phrase set with the first target language phrases in the target language phrase set, so as to form at least one phrase pair in which a source language phrase and a target language phrase semantically match; and storing the formed at least one phrase pair in which the source language phrase and the target language phrase semantically match into a source language-target language corpus.

* * * * *